United States Patent [19]

Butt

[11] 4,325,480
[45] Apr. 20, 1982

[54] CONVEYOR SUPPORT WAY

[75] Inventor: William C. Butt, Lynchburg, Va.

[73] Assignee: Simplimatic Engineering Company, Lynchburg, Va.

[21] Appl. No.: 758,932

[22] Filed: Jan. 13, 1977

[51] Int. Cl.³ .................. B65G 15/60; B65G 17/00
[52] U.S. Cl. .................................. 198/841; 198/721
[58] Field of Search ............... 198/841, 836, 721, 792; 193/38, 41, 27; 187/95

[56] References Cited

U.S. PATENT DOCUMENTS

| | | | |
|---|---|---|---|
| 1,647,665 | 11/1927 | Riche | 193/38 |
| 3,094,206 | 6/1963 | Stewart et al. | 198/841 X |
| 3,605,994 | 9/1971 | Parlette | 198/836 X |
| 3,800,938 | 4/1974 | Stone | 198/836 X |
| 3,881,594 | 5/1975 | Jepsen | 198/841 X |
| 3,944,057 | 3/1976 | Schuette et al. | 198/721 |

FOREIGN PATENT DOCUMENTS 1380653  1/1975  United Kingdom ............... 198/721

*Primary Examiner*—Robert B. Reeves
*Assistant Examiner*—Douglas D. Watts
*Attorney, Agent, or Firm*—James & Franklin

[57] ABSTRACT

A conveyor support way for a table top chain comprises a series of alternating first and second cross members in spaced disposition transverse to the axis of the conveyor support way. Each of the first cross members contains a first pair of open top spaces and each of said second cross members contains a second pair of open top spaces, the first pair of spaces being disposed laterally inwardly of the second pair of spaces. A pair of serpentine wear strips are provided to support the chain, each of the wear strips extending along the length of the series of cross members, alternately through an associated one of the first cross member spaces and through an associated one of the second cross member spaces. Each wear strip is axially slidably and easily removably mounted on the series of cross members.

19 Claims, 6 Drawing Figures

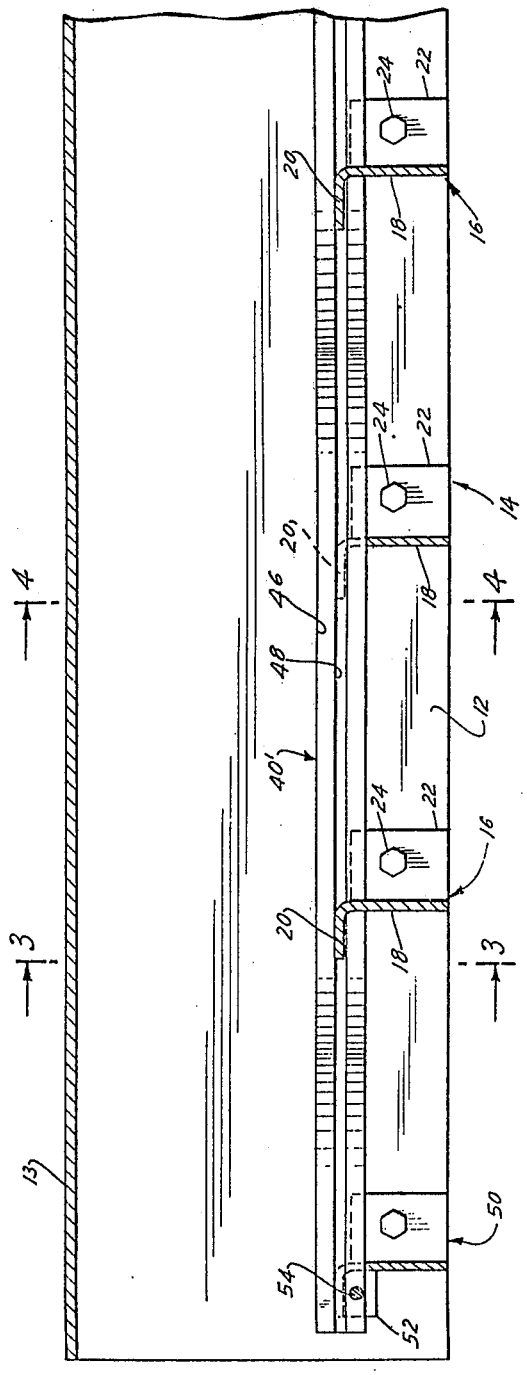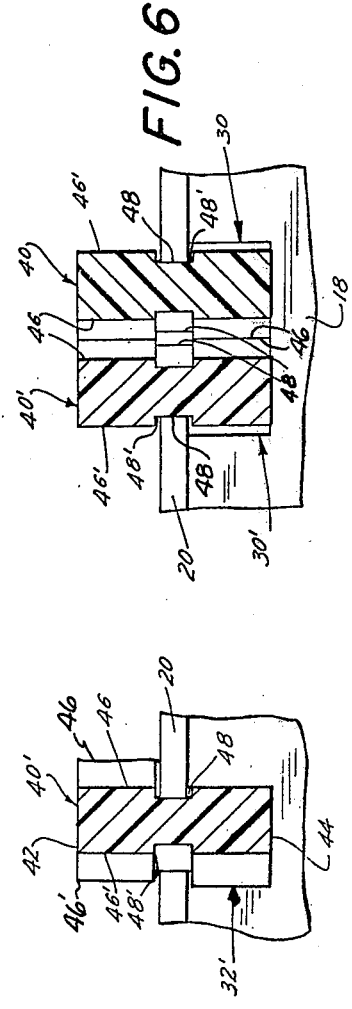

CONVEYOR SUPPORT WAY

BACKGROUND OF THE INVENTION

The present invention relates to a conveyor support way for a table top chain, and more particularly to a conveyor support way utilizing a pair of replaceable wear strips disposed in serpentine fashion along the length of the support way.

A conveyor using "table top" type chain typically includes a conveyor return support way designed to support the unloaded chain as it is transported from the back end of a conveyor to the front end of the conveyor. Such a conveyor support way is desirably provided with replaceable wear strips of low friction material so that, as the wear strips wear out due to the friction involved as the chain passes over the strips, the strips are easily replaced. While wear strips have been provided in numerous configurations in the past (for example, as a slider bed, series of rollers, etc.), the most desirable pattern has been a pair of round or rectangular strips of material which wind from one end of the conveyor support way to the other in a "serpentine" configuration. In order to maintain the wear strips in the desired serpentine configuration, the wear strips have typically been bolted or otherwise fastened to cross members disposed in spaced relationship along the length of the return way.

While the technique of bolting serpentine wear strips to cross members appropriately positioned along the length of the conveyor support way has proven to be useful where the wear strips are formed of material having a low thermal coefficient expansion, it has not proven to be entirely satisfactory. In particular, the bolting technique is not useful where the wear strip is composed of a material having a high thermal coefficient of expansion. It will be recognized that when a strip of material is fixedly secured between two stationary members and is then heated, the resultant expansion of material must evidence itself in some manner, typically either by an increased lateral curvature of the serpentine wear strip (thus depriving the chain of support in the intended places) or, more importantly, in a vertical buckling of the serpentine wear strip (thus depriving the chain of the desired support along its full length). Accordingly, various plastic materials with high thermal coefficients of expansion which are otherwise highly suitable for use as wear strips (such as ultra-high molecular weight polyethylene) have not been employable as serpentine wear strips.

And even when materials having a low thermal coefficients of expansion are employed as serpentine wear strips, they are expensive to manufacture (as bolt holes most be drilled therein at precise locations along their length), to install (as each wear strip must be individually bolted to each cross member) and to replace (due to the need to unfasten and then refasten the bolts connecting the wear strips to the cross members).

Accordingly it is an object of the present invention to provide a conveyor support way utilizing serpentine wear strips which does not require the bolting of the wear strips to the cross members.

Another object is to provide such a support way which utilizes wear strips formed of a material having a high thermal coefficient of expansion and yet avoids the problems encountered through vertical buckling of the wear strips.

A further object is to provide such a support way in which the wear strips need not be provided with a series of holes therethrough, and are easily installed and replaced without bolting.

Still another object is to provide such a support way which utilizes plastic wear strips and accommodates the thermal expansion and contraction of the plastic wear strips without negative effects.

SUMMARY OF THE INVENTION

It has now been found that the above and related objects of the present invention are obtained in a conveyor support way wherein the wear strips are received in open top spaces of the cross members without bolting so that the wear strips are axially slidably and easily removably mounted on the cross members.

More particularly, a conveyor support way for a table top chain according to the present invention comprises a series of alternating first and second cross members in spaced disposition transverse to the axis of the conveyor support way. Each of the first cross members contains a first pair of open top spaces, and each of the second cross members contains a second pair of open top spaces. The first pair of spaces are disposed laterally inwardly of the second pair of spaces. The support way further comprises a pair of serpentine wear strips, each of the wear strips extending along the length of the series of cross members, alternately through an associated one of the first cross member spaces and then through an associated one of the second cross member spaces. The wear strips are axially slidably mounted in the spaces in the series of cross members so that thermal contraction and expansion effects are easily accommodated without any resultant vertical buckling. As the wear strips are merely inserted through the open top of the cross member spaces without any bolting, they are easily installed or removed for replacement.

In a preferred embodiment each of the wear strips has a top, bottom and a pair of opposite longitudinally-extending side surfaces connecting the top and bottom. Each of the side surfaces defines a recess extending longitudinally along the length of the side surface, and each of the recesses in turn is engaged by space-defining surfaces of both the first and second cross members (that is, upper edges of the spaced-defining surfaces are received in each of the recesses). Preferably each of the wear strips is of generally rectangular cross section with a longitudinally extending groove along each long side thereof to define an "I" cross section. An outwardly facing corner of the space-defining surface of a second cross member enters the inwardly facing groove of the wear strip while an inwardly facing corner of the space-defining surface of a first cross member enters the outwardly facing groove.

In a typical embodiment the first cross member pair of spaces are contiguous and the opposite sides thereof defined by opposite sides of a single open top slot in the first cross member. In this case the inwardly facing grooves of the wear strips are in close and uninterrupted proximity to each other where the wear strips pass through the slot in the first cross member. Preferably the slot of the first cross member has a width less than the sum of the maximum widths of both the wear strips but more than the sum of the maximum width of one of the wear strips and the minimum width of the other of the wear strips.

Preferably the support way additionally includes a single third cross member in spaced disposition with the other cross members and with at least one of the wear strips (preferably both) being fixedly mounted on the third cross member to preclude axial sliding therebetween. The other end of the wear strip is preferably free for axial movement so as to accommodate thermal expansion of the wear strip.

BRIEF DESCRIPTION OF THE DRAWING

FIG. 2 is a fragmentary longitudinal side sectional view thereof taken along the line 2—2 of FIG. 1;

FIG. 5 is an enlarged fragmentary detail view of the portion of FIG. 3 indicated by the numeral 5; and FIG. 6 is an enlarged fragmentary view of the portion of FIG. 4 indicated by the numeral 6.

DETAILED DESCRIPTION OF THE PREFERRED EMBODIMENTS

Figure 1:
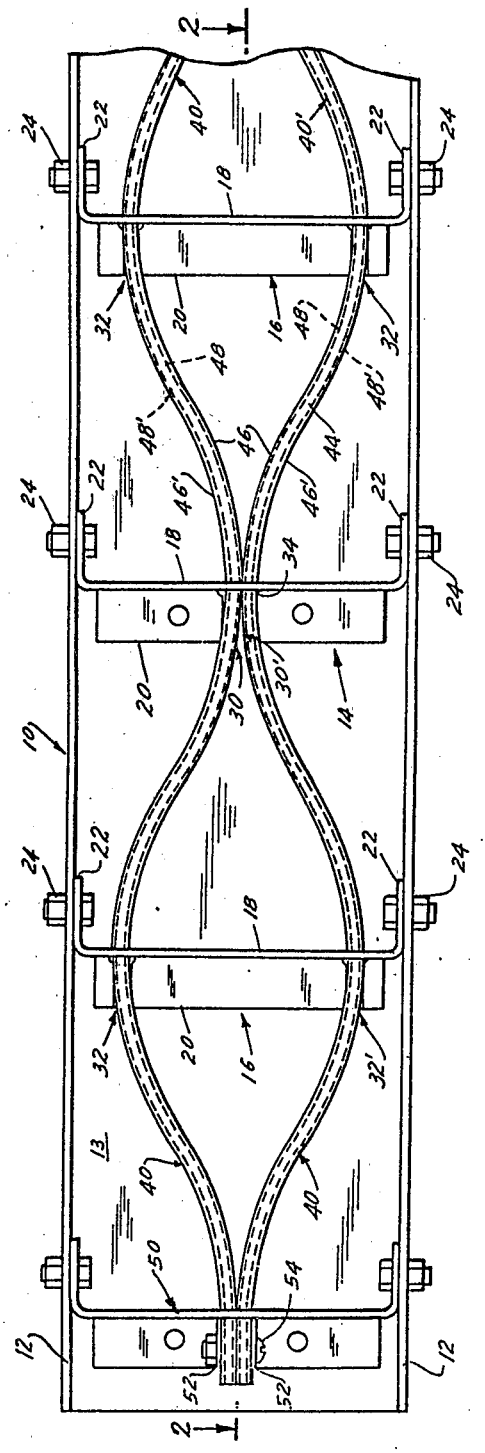
FIG. 1 is a fragmentary bottom plan view of a conveyor support way according to the present invention.
Figure 3:
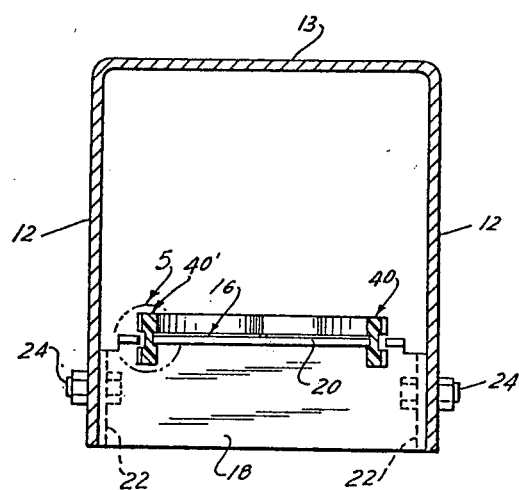
FIG. 3 is an end elevation view taken along the line 3—3 of FIG. 2.
Figure 4:
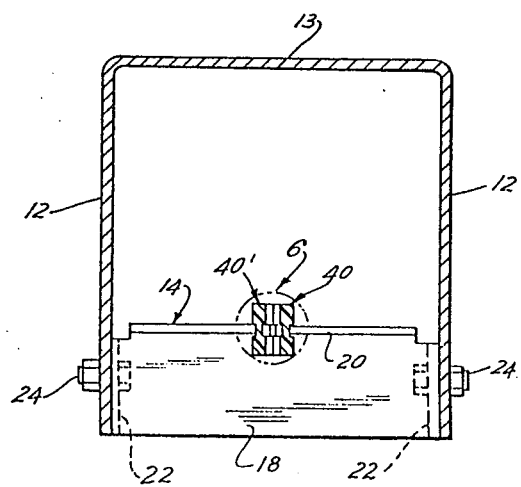
FIG. 4 is an end elevation view taken along the line 4—4 of FIG. 2.

Referring now to the drawing, and in particular to FIGS. 1 and 2 thereof, therein illustrated is a conveyor support way, generally designated 10, for a table top chain, and in particular a return way therefor. The frame of the support way 10 comprises a pair of spaced parallel longitudinal members 12, a top member 13 connecting the longitudinal members 12, and a series of alternating first cross members, generally designated 14, and second cross members, generally designated 16, in spaced disposition transverse to the axis of the longitudinal members 12. The exact number of first and second cross members 14 and 16 utilized in a given support way 10 will be a function of the longitudinal length of the support way 10.

Each cross member 14,16 comprises a body portion 18 extending substantially the entire distance between the longitudinal members 12, a central flange 20 extending perpendicularly from the body portion 18 on one side thereof, and a pair of end flanges 22 extending perpendicularly from the ends of the body portion 18 on the other side thereof. Each end flange 22 is secured to a respective one of the longitudinal members 12 by means of a nut and bolt combination 24. Each of the first cross members 14 includes a pair of open top spaces 30,30' defined by the upper surfaces of the body portion 18 and central flange 20 thereof, and each of the second cross members 16 includes a spaced pair of open top spaces 32,32' defined by the upper surfaces of the body portion 18 and central flange 20 thereof. The open top spaces 30,30' of the first cross member 14 are disposed laterally inwardly of the open top spaces 32,32' of the second cross member 16. In a preferred embodiment, and as illustrated in the drawing, the open top spaces 30,30' of the first cross member 14 are contiguous with one another and are defined by a single open top slot 34 defined by the main body 18 and central flange 20 of the first cross member 14. Typically the spaces 32 and 32' are aligned to form a pair of planes and the slots 34 are aligned to define a third plane intermediate to and substantially equidistant from the pair of planes.

The support way 10 further comprises a pair of serpentine wear strips, generally designated 40 and 40', axially slidably and easily removably mounted on the series of cross members 14,16. Each wear strip 40,40' extends longitudinally along the length of the series of cross members 14,16 in serpentine fashion, alternately through an associated one of the first cross member spaces 30 or 30' and then through an associated one of the second cross member spaces 32 or 32'. Each of the wear strips 40,40' has a top 42, a bottom 44, and a pair of opposite longitudinally extending side surfaces (an inner surface 46 and an outer surface 46') connecting the top 42 and bottom 44 (see FIG. 5). Each of the side surfaces 46,46' defines a U-shaped recess or groove (inner groove 48 being on side surface 46 and outer groove 48' being on side surface 46') extending longitudinally along the length thereof. In other words, each wear strip 40,40' is of generally rectangular cross-section with a longitudinally extending groove 48,48' along each long side 46,46' thereof to define an "I" cross-section.

Referring now in particular to FIGS. 3–6, when the wear strips 40,40' are properly inserted in the cross members 14,16, an upper edge of the space-defining surfaces of both the first and second cross members 14,16 is received in each of the recesses 48,48', and, more particularly, each of the recesses 48,48' is engaged by a space-defining surface of the central flange 20 of both the first and second cross members 14,16. More specifically, an outwardly facing corner of the space-defining surface of the second cross member central flange 20 enters the inwardly facing groove 48 and an inwardly facing corner of the space-defining surface of the first cross member central flange 20 enters the outwardly facing groove 48'.

When the open-top spaces 30,30' of the first cross member 14 are formed by a single open-top slot 34 (as illustrated), the inwardly facing grooves 48 of the wear strips 40,40' are in close and uninterrupted proximity to each other where the wear strips 40,40' pass through the slot 34 of the first cross member 14. Preferably this slot 34 has a width less than the sum of the maximum widths of both wear strips 40,40', but more than the sum of the maximum width of one of the wear strips 40,40' and the minimum width of the other of the wear strips 40,40'. This insures that both wear strips 40,40' can be inserted into the slot 34 by first inserting one strip, manually pushing it as far as possible to one side (so that the space-defining surface of the first cross member 14 enters the recess 48'), and then inserting the other strip. On the other hand, as the slot width is less than the sum of the maximum widths of both wear strips 40,40', neither strip can be accidentally dislodged from the slot 34 because of the forces tending to keep both resiliently flexed wear strips centered in the slot 34. On the other hand, the wear strips 40,40' are easily removed from the slot 34 for replacement purposes merely by manually displacing one wear strip to an extreme side of the slot 34, removing the other wear strip, relocating the displaced wear strip in the center of slot 34, and then removing the relocated wear strip.

The cross members 14,16 are formed of rigid material having sufficient strength to support the weight of the conveyor chain and are typically formed of metal. The wear strips 40,40' are formed of a resiliently flexible low friction material, and may desirably be formed of a plastic such as high molecular weight polyethylene. The recesses 48,48' of each wear strip are located at a point along the height thereof so as to enable the bottom 44 of the wear strip to rest on the bottom of the open-top space 30,30', 32,32' of the cross member 14,16, thus reducing the vertical stress on the portions of the wear strip overhanging the side space-defining surfaces of the central flanges 20. For this purpose also the open top spaces in the body portion 18 are preferably appreciably larger than those in the central flange 20.

In a preferred embodiment an optional third cross member, generally designated 50, is provided, preferably at one end of the conveyor support way 10. The third cross member 50 is identical in all respects to one of the other cross members 14,16 (preferably cross member 14, as illustrated) except for the presence of a pair of apertured flanges 52 which extend downwardly from the central portion 20 thereof, about the slot 34 thereof, to enable the wear strips 40,40′ to be bolted to the third cross member 50, for example, by means of a nut and bolt combination 54 passing through the flanges 52 and the apertures provided in both wear strips. Obviously other means may be provided to secure the wear strips to the third cross member 50 in such a manner as to preclude sliding motion of the wear strips relative to the third cross member 50 in the direction of the support way axis. The free ends of the wear strips 40,40′ are allowed to extend beyond the last of the series of cross members 14,16 a distance sufficient so that they will still project therefrom at the lowest temperature expected to be encountered in use. As the wear strips 40,40′ are secured in non-slidable fashion to only the third cross member 50, thermal expansion and contraction of the wear strips is accommodated by sliding of the wear strips 40,40′ through the open-top spaces 30,30′, 32,32′ in the direction of the conveyor support axis away from cross member 50. This sliding motion releases stresses caused by thermal expansion and contraction of the strips due to temperature changes so that vertical buckling is entirely avoided and lateral buckling is minimized, even for materials having a high thermal coefficient of expansion. Thus the primary noticeable change in the support way resulting from a thermal change is the degree to which the free ends of the wear strips 40,40′ extend beyond the last of the series of cross members 14,16.

It will be noted that the wear strips 40,40′ are easily installed on the cross members 14,16 through the open-top spaces therein. The only aperture which need be formed in either wear strip is the optional single aperture for use in conjunction with the nut and bolt combination 54 of optional third cross member 50. Thus the wear strips are easily insertable into and removable from the various cross members, the only tool required being whatever is necessary to open and close the nut and bolt combination 54. Because the thermal expansion and contraction of the wear strips is accommodated by the slidability of the wear strips relative to the cross members 14,16, materials having a relatively high thermal coefficient of expansion may be utilized therein, such as high molecular weight polyethylene. Of course, if desired, conventional material having a low thermal coefficient of expansion may also be utilized.

Now that the preferred embodiments of the present invention have been shown and described in detail, various modifications and improvements thereon will become readily apparent to those skilled in the art. Accordingly, the spirit and scope of the present invention is to be limited only by the appended claims and not by the foregoing disclosure.

I claim:

1. A conveyor support way for a table top chain comprising:
   (A) a series of alternating first and second cross members in spaced disposition transverse to the axis of said conveyor support way, each of said first cross members containing a first pair of open top spaces and each of said second cross members containing a second pair of open top spaces, said first pair of spaces being disposed laterally inwardly of said second pair of spaces;
   (B) a pair of serpentine wear strips, each of said wear strips extending along the length of said series of cross members, alternately through an associated one of said first cross member spaces and through an associated one of said second cross member spaces, and being axially slidably and easily removably mounted on said series of cross members; each of said wear strips is of generally rectangular cross-section with a longitudinally extending groove along each long side thereof to define an "I" cross-section, and each of said spaces of said first and second cross members having a minimum width greater than the maximum width of each said wear strip passing therethrough so that said wear strips sit loosely in said spaces, said wear strips being insertable into and removable from said cross member spaces without the use of tools by displacements of said wear strips relative to said cross members in a direction substantially perpendicular to the axis of said wear strips.

2. The way of claim 1 wherein each of said wear strips have a top, a bottom and a pair of opposite side surfaces connecting said top and bottom, each of said side surfaces defining a recess extending along the length of said side surface, each of said recesses being engaged by space-defining surfaces of both said first and second cross members.

3. The way of claim 2 wherein an upper edge of said space-defining surfaces is received in each of said recesses.

4. The way of claim 1 wherein an outwardly facing corner of the space-defining surface of a second cross member enters the inwardly facing groove and an inwardly facing corner of the space-defining surface of a first cross member enters the outwardly facing groove.

5. The way of claim 4 wherein said first cross member pair of spaces are contiguous and the sides thereof defined by opposite sides of a single open top slot of said first cross member.

6. The way of claim 5 wherein the inwardly facing grooves of said wear strips are in close and uninterrupted proximity to each other where said wear strips pass through said slot of said first cross member.

7. The way of claim 6 wherein said slot of said first cross member has a minimum width less than the sum of the maximum widths of both said wear strips and more than the sum of the maximum width of one of said wear strips and the minimum width of the other of said wear strips.

8. The way of claim 5 wherein said spaces of said second cross members are aligned to define a pair of planes and said spaces of said first cross members are aligned to define a third plane intermediate to and substantially equidistant from said pair of planes.

9. The way of claim 1 wherein said wear strips are of plastic material.

10. The way of claim 1 wherein said wear strips are resiliently flexible.

11. The way of claim 1 wherein said wear strips contact the bottoms of said spaces.

12. The way of claim 1 additionally including a single third cross member in spaced disposition with said other cross members, at least one of said wear strips being fixedly mounted on said third cross member to preclude axial sliding therebetween.

13. The way of claim 12 wherein one end of each of said wear strips is fixed mounted on said third cross member, and the other end of each of said wear strips is free for axial movement.

14. The way of claim 1 wherein said first cross member pair of spaces are contiguous and the sides thereof defined by opposite sides of a single open top slot of said first cross member.

15. The way of claim 1 wherein said wear strips are insertable into and removable from said first and second cross members spaces through the open tops thereof.

16. The way of claim 1 wherein each of said first and second cross members are parallel to each other.

17. The way of claim 1 wherein said wear strips are of a plastic material having a high thermal coefficient of expansion.

18. The way of claim 5 wherein said single open top slot is disposed equidistantly from the ends of said first cross members.

19. The way of claim 1 wherein said first and second cross members are rigid and said wear strips fit loosely in said open-top slots.

* * * * *